(12) United States Patent
McKnight et al.

(10) Patent No.: US 7,359,451 B2
(45) Date of Patent: *Apr. 15, 2008

(54) SYSTEM AND METHOD FOR WIRELESSLY TRANSMITTING AND RECEIVING DIGITAL TOKENS FOR USE IN ELECTRONIC GAMEPLAY

(75) Inventors: Thomas Richard McKnight, Ellicott City, MD (US); Eric C. Haseltine, Odenton, MD (US); Jesse N. Schell, Carnegie, PA (US)

(73) Assignee: Disney Enterprises, Inc., Burbank, CA (US)

( * ) Notice: Subject to any disclaimer, the term of this patent is extended or adjusted under 35 U.S.C. 154(b) by 984 days.

This patent is subject to a terminal disclaimer.

(21) Appl. No.: 10/465,334

(22) Filed: Jun. 19, 2003

(65) Prior Publication Data
US 2004/0081313 A1 Apr. 29, 2004

Related U.S. Application Data

(60) Provisional application No. 60/390,476, filed on Jun. 21, 2002, provisional application No. 60/390,500, filed on Jun. 21, 2002.

(51) Int. Cl.
*H04L 27/04* (2006.01)
(52) U.S. Cl. .................................. 375/295
(58) Field of Classification Search ............... 375/295, 375/300, 302, 316; 370/526
See application file for complete search history.

(56) References Cited

U.S. PATENT DOCUMENTS

| 4,661,659 A | 4/1987 | Nishimura ................. 379/61 |
| 4,817,135 A | 3/1989 | Winebaum ................ 379/355 |
| 4,864,604 A | 9/1989 | Aihara ...................... 379/110 |
| 4,926,464 A | 5/1990 | Schley-May ................ 379/99 |
| 4,980,910 A | 12/1990 | Oba et al. .................. 379/355 |
| 4,995,077 A | 2/1991 | Malinowski ............... 379/355 |
| 5,081,441 A | 1/1992 | Chojar ...................... 340/384 |
| 5,099,507 A | 3/1992 | Mukai et al. ............... 379/57 |
| 5,280,516 A | 1/1994 | Jang .......................... 379/57 |
| 5,343,519 A | 8/1994 | Feldman .................... 379/355 |
| 5,357,566 A | 10/1994 | Dowling, Jr. et al. ....... 379/355 |
| 5,392,447 A | 2/1995 | Schlack et al. ............ 395/800 |
| 5,452,352 A | 9/1995 | Talton ....................... 379/355 |
| 5,455,857 A | 10/1995 | McGuire .................... 379/355 |

(Continued)

FOREIGN PATENT DOCUMENTS

EP 0550144 A1 7/1993

OTHER PUBLICATIONS

PCT International Search Report for International Application No. PCT/US 03/. 19409: date of international search Sep. 24, 2003; date of mailing Oct. 6, 2003.

*Primary Examiner*—Khai Tran
(74) *Attorney, Agent, or Firm*—Greenberg Traurig, LLP

(57) ABSTRACT

A system and a method for the transmission and reception of digital data wirelessly using acoustic tones comprises a device having an encoder, a modulator system, a demodulator system, and a decoder. The modulator system uses a plurality of acoustical tones with a fundamental frequency and multiple harmonics that are amplitude modulated. The received signal is demodulated and detected by quadrature detectors comprising replicas of the acoustical tones. An extended Golay code based decoder is used for correcting errors occurring during transmission.

43 Claims, 15 Drawing Sheets

U.S. PATENT DOCUMENTS

| | | | |
|---|---|---|---|
| 5,583,919 A | 12/1996 | Talvard et al. | 379/67 |
| 5,583,933 A | 12/1996 | Mark | 379/355 |
| 5,636,270 A | 6/1997 | Davey | 379/352 |
| 5,671,271 A | 9/1997 | Henderson et al. | 379/355 |
| 5,786,819 A | 7/1998 | Weiser et al. | 345/354 |
| 5,790,644 A | 8/1998 | Kikinis | 379/144 |
| 5,901,217 A | 5/1999 | Kanbar | 379/355 |
| 5,930,703 A | 7/1999 | Cairns | 455/418 |
| 5,963,637 A | 10/1999 | Arzoumanian | 379/355 |
| 5,978,654 A | 11/1999 | Colwell et al. | 455/31.1 |
| 5,982,520 A | 11/1999 | Weiser et al. | 359/172 |
| 6,028,926 A | 2/2000 | Henderson et al. | 379/355 |
| 6,119,944 A | 9/2000 | Mulla et al. | 235/472.03 |
| 2002/0189430 A1* | 12/2002 | Mukojima | 84/615 |
| 2003/0118199 A1* | 6/2003 | Marquis et al. | 381/79 |

\* cited by examiner

Time (sesonds)

Time (sesonds)

SYSTEM AND METHOD FOR WIRELESSLY TRANSMITTING AND RECEIVING DIGITAL TOKENS FOR USE IN ELECTRONIC GAMEPLAY

CROSS-REFERENCE TO RELATED APPLICATIONS

The contents of this application are related to provisional applications having Ser. Nos. 60/390,500 (filed Jun. 21, 2002) and 60/390,476 (filed Jun. 21, 2002). The contents of these related provisional applications are incorporated herein by reference.

BACKGROUND OF THE INVENTION

1. Field of the Invention

The present invention relates to communication devices for communicating signals wirelessly.

Especially, the present invention relates to a system and method for transmitting digital data between communicating devices using acoustic tones as the information carriers for the data.

2. General Background

One of the most difficult challenges faced by providers of low cost wireless computer peripheral devices is the need to distribute custom interface hardware so that the peripheral device can communicate with the computer. The interface hardware not only adds cost to the product, but for many products such as low cost toys, the sales and distribution channels are not prepared to support the distribution of these additional computer devices.

As a result, a mechanism is required whereby devices can communicate with a personal computer, or with each other, using standard hardware (e.g., digital signal processing chips, analog to digital converters, etc.). In addition, the devices, employing this communication mechanism, should be flexibly designed to operate in conditions where line-of-sight communication between said devices is required.

There are many techniques that encode data into an audio frequency signal for transmission and subsequent detection over a communications channel. These techniques as a class are fundamentally different in that they do not use the acoustic medium (air or another material) pressure waves as the communications mechanism.

SUMMARY OF THE INVENTION

Clearly there is a need for using sound or acoustic tones as carriers of digital data in simple and low cost devices. Specifically, the present invention of using acoustic tones as carriers of digital data arose from the need to transmit low bandwidth data between a peripheral device and a computer (or another device) using existing sound recording and playback means such as loudspeakers and microphones, respectively.

The system and method of the present invention allows for the transmission (and reception) of digital data wirelessly using sound. Specifically, this technique modulates digital data bits onto chords consisting of three or more pure tone musical notes. This involves a modulation scheme, such as amplitude modulation, of each of the individual tones within the chord relative to each other. Because of the nature of the modulation, humans are unable to discern a difference in the sound of the transmission for different data patterns. At the receiver, demodulation is done so that the digital data is extracted from the pure tone musical notes. The use of this technique can be extended such that the tonal "content" for a variety of applications can be developed where such tonal content is not adversely affected by the presence of external noise. From a hardware perspective, the communication between devices is enabled by means of digital signal processors (DSPs) that have embedded algorithms to perform modulation and demodulation, analog-digital converters, loudspeakers, etc.

Accordingly, in one embodiment of the present invention, the digital data transmitting system using acoustic tones comprises a device having: (i) at least one generator for generating digital data; (ii) a modulator system, the modulator system modulating a plurality of pure tone notes with the digital data; and (iii) at least one loudspeaker, the loudspeaker transmitting the modulated tones. Additionally, the digital data includes a pseudo random code, a plurality of message bits, and a plurality of correction bits. The correction bits are based on error correcting codes such as an extended Golay code. The pure tone notes may either lie in the infrasonic, audio, or ultrasonic band. Furthermore, the device may include a view screen, scroll buttons (or a mouse type device) for selecting a specific object displayed on the screen. The digital data, corresponding to the object, may be used as a vehicle for transmitting the object to another device. For example, in a children's game, the object may correspond to a magic wand, and a player can transfer this wand, using the present invention, to another player having a similar device.

In another embodiment of the present invention, a receiver, in the device, for receiving the acoustic tones modulated by digital data comprises: (i) a plurality of quadrature detectors, one for each of the plurality of tones, for recovering a baseband signal from a bandpass signal, the bandpass signal includes the plurality of amplitude modulated tones; (ii) a data detector for detecting data in the baseband signal following a first pseudo random code sequence and a second pseudo random code sequence; (iii) a correlator for extracting the plurality of message bits following the first pseudo random code sequence and the plurality of correction bits following the second pseudo random code sequence; and (iv) a decoder for determining the number of errors in the message bits. The decoder may be an extended Golay code decoder. Additionally, the device will include a microphone for receiving the digitally modulated data. After demodulation, the view screen on the device will depict the object corresponding to the demodulated data. For example, the object could be the magic wand transmitted from another device.

BRIEF DESCRIPTION OF THE DRAWINGS

In order that the manner in which the above-recited advantages and objects of the invention are attained, as well as others which will become apparent, more particular description of the invention briefly summarized above may be had by reference to the specific embodiments thereof that are illustrated in the appended drawings. It is to be understood, however, that the appended drawings illustrate only typical embodiments of the invention and are therefore not to be considered limiting of its scope, for the invention may admit to other equally effective embodiments.

In the drawings.

DETAILED DESCRIPTION OF THE INVENTION

Figure 1:
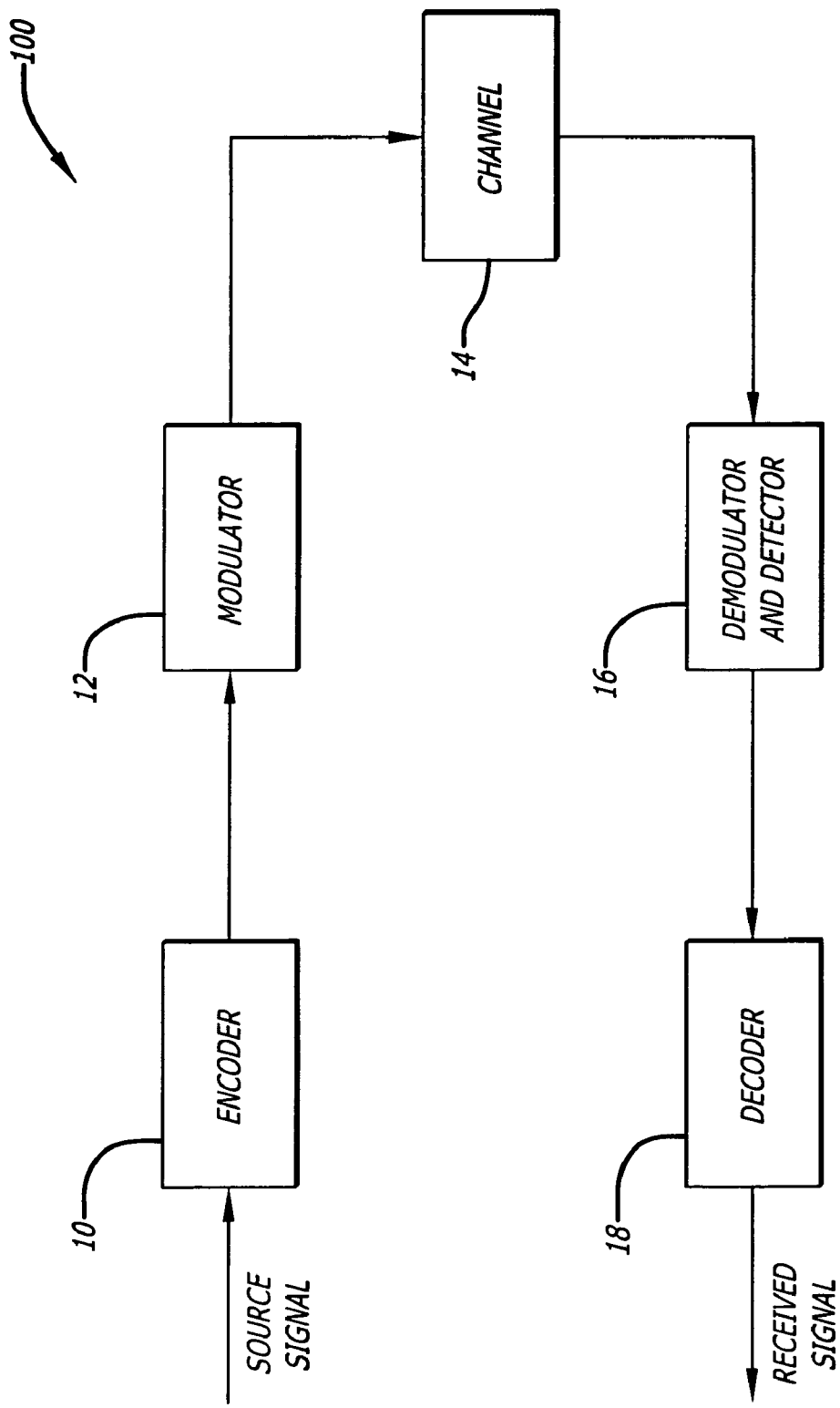
FIG. 1 is a block diagram of the communication system for using acoustic tones for wireless communication.

Referring now in detail and by reference characters to the drawings (FIGS. 1-19), which illustrate several different embodiments of the present invention, therein shown is a system for transmitting and receiving acoustic tones for wireless communications. Such a system, as in the present invention, employs circuits that enable transmission of low bandwidth data between multiple devices (or a computer) using the device's hardware (e.g., sound card, microphone, loudspeaker, DSP chips, analog-digital converters, etc.). The communication environment could be a living room, an automobile cabin, a telephone channel, a non-confined environment (e.g., a playground), etc.

The device is designed to reliably receive and decode digital data (also referred to as tokens throughout the specification) sent over an audio signal (from TV speakers, home-theater speakers, boom-box/radio, computer speakers, etc.) in the average living room, media room or den, anywhere within a reasonable distance, such as between about 2-30 ft of the speakers, and within a volume of space subtended by pi radians in front of the speakers. The device is designed so that the signal reception is independent of the loudspeaker system and room characteristics (e.g., reverberation time), and it is reliable in the presence of noise when the audio is at normal listening levels. Furthermore, the device is designed so that signal reception at the device is independent of the location of the device inside the specified distance from the sound source.

As an example, the range of normal listening level for a TV speaker at a viewing distance of 10 ft is between 50 to 60 dBA, and typical interior residential noise level is 30 to 40 dBA, and 50 to 55 dBA with voices. Possible ambient noise sources include voices, music, barking dogs and other household sounds. Both impulsive and continuous noise sources can be expected. A reasonable upper limit for background noise level is 60 dBA. Thus the device is designed to transmit/receive signals at the expected signal to noise ratio ranging between +27 dBA to −3 dBA in a typical room.

The source signal (as shown in FIG. 1) could be an audio based signal (frequency range of 20 Hz-20 kHz), an infrasonic signal (below the threshold of hearing), or an ultrasonic signal (above 20 kHz). For example, the sound source could be the "Dong" at the end of the sound that is played on the TV show "Who Wants to be a Millionaire". Digital data (also called tokens) could be encoded into this "Dong" sound, via the encoding scheme of the present invention, and the received signal could be demodulated/decoded by a receiver embedded in the device. The demodulation scheme, implemented in the receiver, is done via the present invention.

It is important that the communication of digital data or tokens between the devices be reliable. Specifically, in the preferred embodiment under best-case conditions, no more than 1 misread or undetected token out of 10,000 tokens broadcast are allowed. Under the worst-case conditions, no more than 1 misread or undetected token out of 1000 tokens broadcast should be permitted.

Furthermore, the communication algorithms, according to the present invention, should be robust under the presence of noise in different environments. Noise can be characterized as continuous or impulsive, and broadband or fixed-frequency (narrow band). Noise can also be classified by annoyance factors: voices and music may be deemed more annoying than random noise, as are hammering (impulsive) or continuous tones (narrow band). As a reference, once a noise level exceeds 67 dBA, it begins to interfere with communication between people 3 ft. apart. Further details on noise and its effects in different environments will be presented below.

It is also important to maintain a certain data rate for communication between the devices. While a minimum data rate of 24 bits/sec should be achieved, a more important measure is the duration of a token. A 16-bit token at 24 bits/sec takes two thirds of a second, but this does not take into account the bits that may be required for synchronization and/or data correction schemes. Thus, in one aspect of the present invention, a complete token is no longer than 1 second in duration.

The devices can communicate with each other in a variety of environments, and at various signal to noise ratios, including:

Living Room:

The devices are able to reliably receive and decode digital data or tokens sent over a television audio signal in the average living room, media room or den, anywhere within approximately 2-30 ft of the TV screen, and within a volume of space subtended by pi radians in front of the speakers. The devices are designed so that the signal reception is substantially independent of the speaker system and room characteristics. Also, the devices are designed to communicate reliably in the presence of noise when the TV audio is at normal listening levels. Furthermore, the signal reception is independent of the location of the device inside the specified distance from the screen.

Regarding noise, the typical interior residential noise level is 30 to 40 dBa, 50 to 55 dBa with voices. Possible ambient noise sources include voices, music, barking dogs and other household sounds. Both impulsive and continuous noise sources can be expected. A reasonable upper limit for background noise level is 60 dBa. Accordingly, the devices are designed to accommodate a signal to noise ratio ranging between +27 dB and −3 dB.

Automobile:

The devices are able to reliably receive and decode tokens sent over a radio signal in the average automobile. The devices are designed so that the the signal reception is substantially independent of the speaker system and automobile cabin interior characteristics, and the devices operate reliably in the presence of noise when the audio is at normal listening levels. Also, the signal reception, at the devices, is independent of the location of the device inside the vehicle.

While very dependent on vehicle type, the range of the normal listening level for an audio signal, such as radio, in an automobile is typically 65 dBA (at low speeds) to 78 dBA (at high speeds). A reasonable lower limit is 60 dBA.

Regarding noise, it can vary considerably with the velocity of the car. Engine and drive train noise is typically low frequency (<100 Hz), while aero-acoustic and tire noise is middle frequency and increases with increasing velocity. Also, there are air conditioning and air sounds from open windows. Other than the occasional horn blast and crash, most interior vehicle noise is generally continuous.

Typical interior vehicle noise levels (for test vehicles such as Honda Accord and CRV):

Stopped, in traffic 53 dBA 70 mph, constant 66 dBA to 70 dBA

Accelerating with window partially open 86 dbA

The occupants typically set the radio volume at 3 to 10 dB over the ambient noise. Accordingly, the devices are designed to accommodate a signal to noise ratio ranging between +12 dB to −10 dB.

Desktop Environment:

The devices are able to reliably receive and decode tokens, sent via personal computer multimedia speakers in the average bedroom, office or den, anywhere within an average distance, perhaps, 4 ft, of the speakers. The devices are designed so that the signal reception is substantially independent of the speaker system and room characteristics. Also, the devices operate with reliability in the presence of noise when the PC audio is at normal listening levels. Additionally, the device is designed so that the signal reception is independent of the location of the device inside the specified distance from the speakers.

The range of normal listening level for PC audio at a distance of 4 ft is 55 to 65 dBA. A reasonable lower limit is 55 dBA. In the home environment, noise levels are expected to be of the order of the levels found in the living room environment. In an: office environment, typical background noise levels are about 45 to 55 dBA, including fan noise, or 55 to 65 dBA when a person is listening to music on his or her computer. Nearby activity and conversation can raise this to anywhere from 65 to 80 dBA. A reasonable worst case for background noise in an office is 75 dBA. Accordingly, the devices are designed to accommodate a signal to noise ratio ranging between +10 dB to −10 dB.

Telephone Channel:

The devices are able to reliably receive and decode tokens sent via a telephone audio signal within about 2 in. of the telephone headset or hands-free speaker.

A telephone dial tone at this distance ranges from 48 dBA to 55 dBA, with 52 dBA being typical, and 48 dBA being a reasonable lower limit.

Expected background noise is similar to the home and office scenarios above, and are therefore expected to be 50 to 65 dBa, with 65 dBa being a reasonable upper limit. Accordingly, the devices are designed to accommodate a signal to noise ratio ranging between +5 dB to −17 dB.

Open Environment (e.g., Playground):

The device is able to reliably receive and decode tokens sent by another device in relatively close proximity, or within 2 to 4 in, in a variety of environments, including outdoors. Of course, this distance may be varied. A typical location is a school playground during recess.

This scenario is interesting for two reasons: (i) the token can be sent from a speaker of many different designs and at volumes that we can be specified, and (ii) lower reliability is acceptable, since to a certain extent users will retry until the token transfer is accomplished.

Typical noise levels in an outdoor urban environment are both impulsive and continuous and are in the range of 45 to 65 dBA, with peaks of up to 70 dBA, depending on proximity to traffic and commercial noise sources. Kids yelling in a playground can exceed 90 dBA. Accordingly, the devices are designed to accommodate a range of signal to noise ratios.

Figure 7:
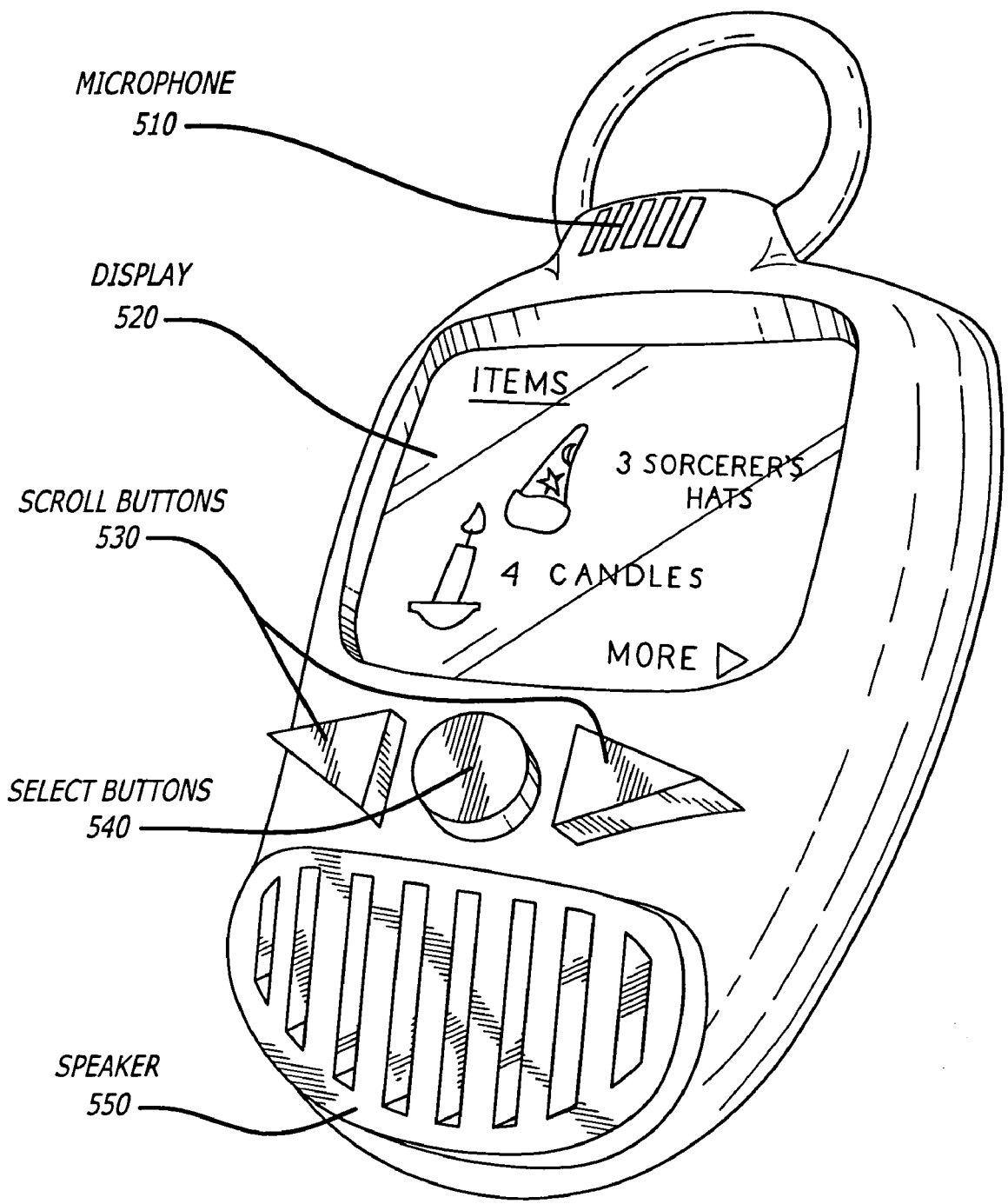
FIG. 7 is an exemplary view of a device having at least one embedded DSP chip for performing modulation/demodulation, analog-digital converters, digital-analog converters, microphone, loudspeaker, scroll buttons, selection buttons, and a view screen.

An example of such a device is shown in FIG. 7. Specifically, FIG. 7 shows an exemplary view of a device 500 having at least one embedded DSP chip (not shown) for performing encoding/decoding of digital signals, analog-digital converters (not shown), digital-analog converters (not shown), microphone 510, loudspeaker 550, scroll buttons 530, selection buttons 540, and a view screen or display 520. Thus, information received by the microphone 510 is decoded and the item corresponding to the transmitted digital data (or token) is displayed on the view screen 520. As an example, the view screen 520 displays items such as sorcerer hats and candles, and these items may have been transmitted from another similar device. In another aspect of the invention, if a person wants to transmit an item, such as a candle, during a trade, the person may then use scroll buttons 530 and the selection button 540 to locate and select the candle on the view screen 520. Upon selection of the item, the digital data (or token) corresponding to the candle may be loaded from a buffer or synthesized by means of a sound card. The digital data (or token) may be encoded, and the resulting signal may then be used to modulate an audio/sound signal. The modulated signal is finally transmitted by a loudspeaker to another similar device.

Figure 8:
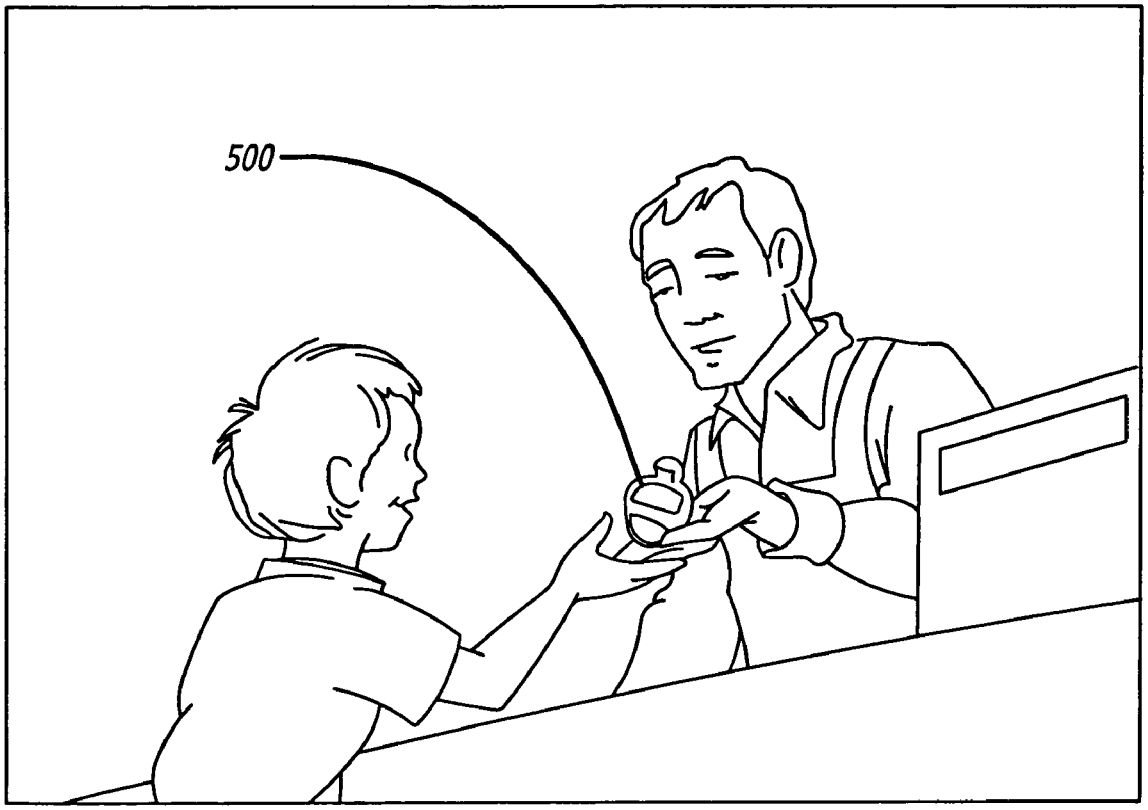
FIG. 8 shows a child obtaining the device from a shopkeeper.

FIG. 8 shows a child obtaining the device 500 from a shopkeeper. Alternatively, the device 500 may be given as part of a promotion to attract people/children to an event.

Figure 9:
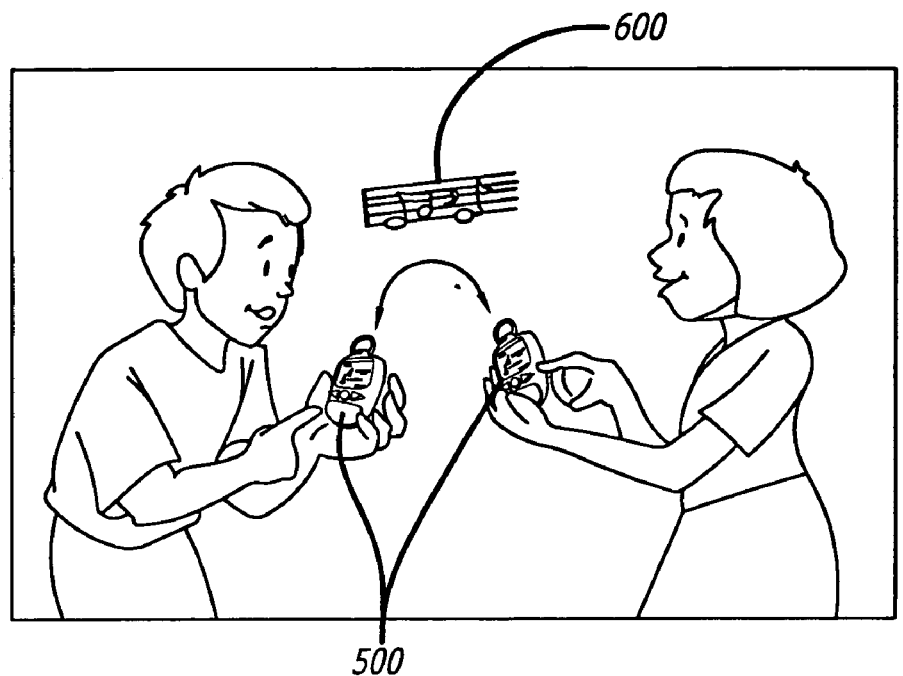
FIG. 9 depicts one application of the present invention where there is a bi-directional exchange of data between the devices used by children in a room environment.

FIG. 9 depicts one application of the present invention where there is a bi-directional exchange of data between the devices 500 used by children in a room environment. In this case, the token data (corresponding to an item to be traded between the children) may be transmitted by means of musical tones (depicted as 600) which are pleasing to the ear. Alternatively, the token data may be embedded in non-musical audio signals (e.g., in a Mickey Mouse character's voice).

Figure 10:
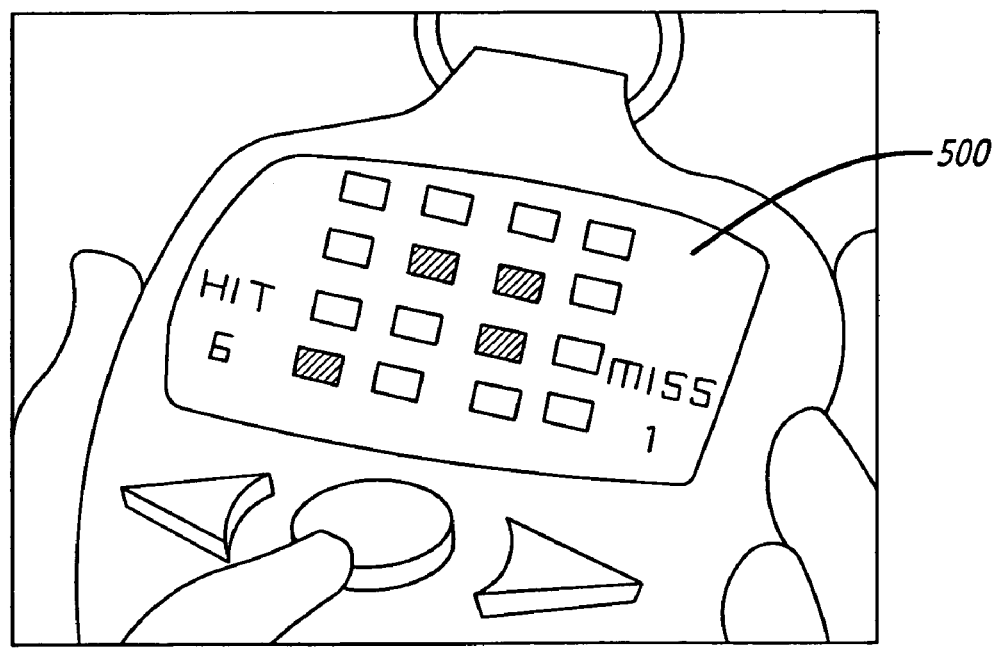
FIG. 10 is a display on the view screen that shows specific objects collected by the child after completing the data exchange according to FIG. 9.

FIG. 10 is a display on the view screen that shows specific objects collected by the child after completing the data exchange according to FIG. 9. Alternatively, the device 500 may be designed to include at least one game that will allow children to be entertained.

Figure 11:
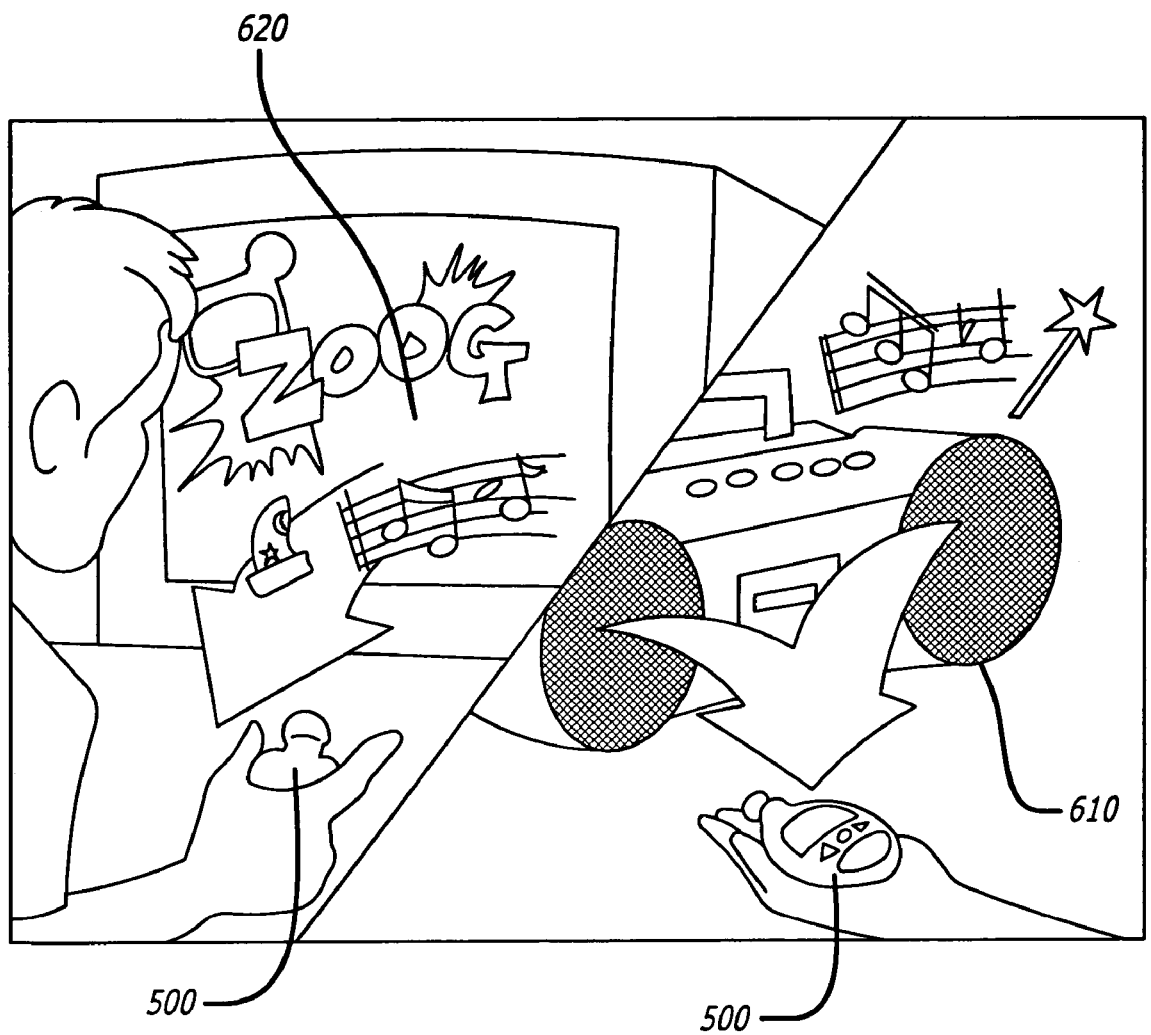
FIG. 11 depicts one application of the present invention where there is an unidirectional data flow between a radio/boom-box and the device in a room environment.

FIG. 11 depicts one application of the present invention where there is a unidirectional data flow between a radio/boom-box 610 and the device 500 in a room environment. The data/tokens may be transmitted by means of a musical or non-musical audio signal 620 via a regular radio program or through a special promotional event. The device 500 may thus capture the tokens, which may subsequently be redeemed for either a cash prize or an article.

Figure 12:
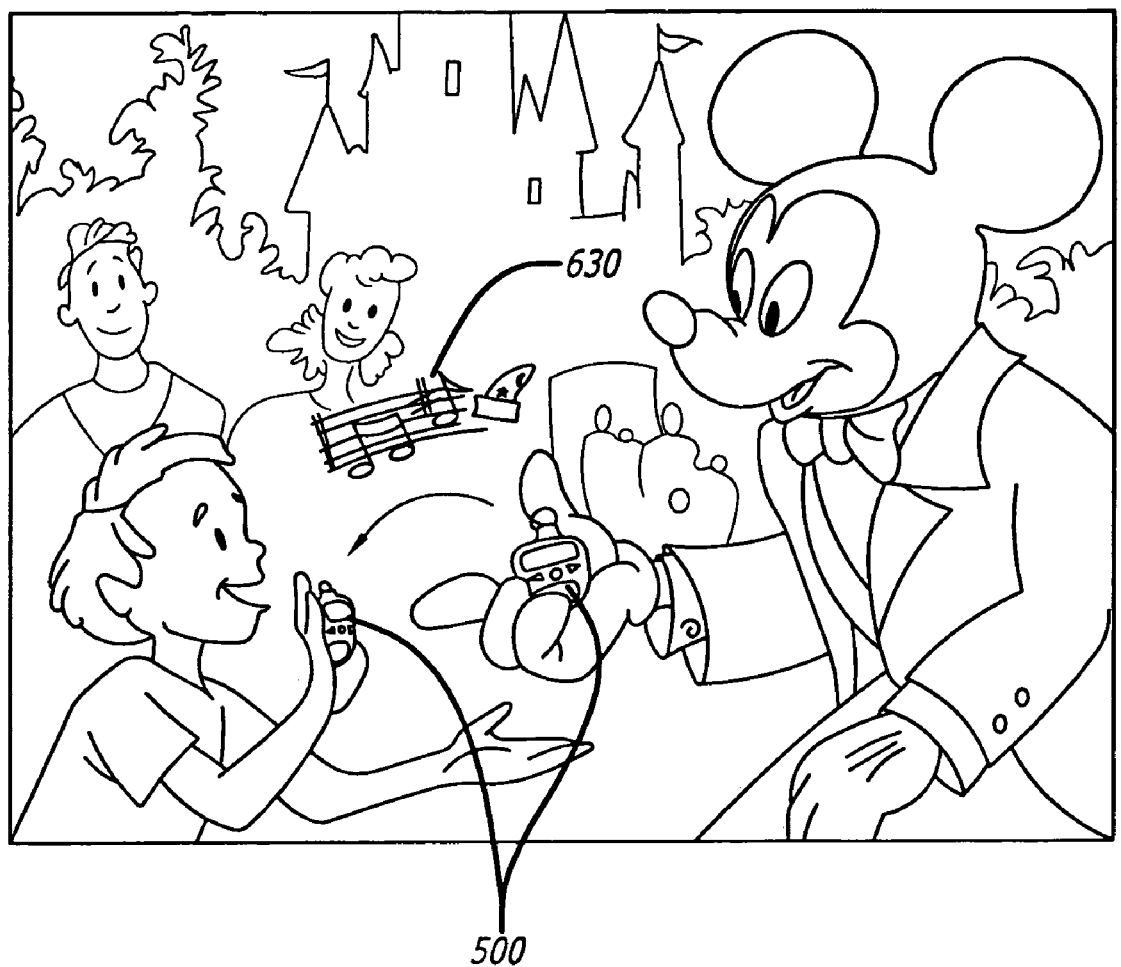
FIG. 12 depicts one application of the present invention where there is a bi-directional exchange of data between the devices used by child and an adult in a non-confined environment (e.g., a playground)

FIG. 12 depicts another application of the present invention where there is a bi-directional exchange of data (or tokens) using a musical/non-musical audio signal 630 between multiple devices 500 in a non-confined environment (e.g., a playground).

Figure 13:
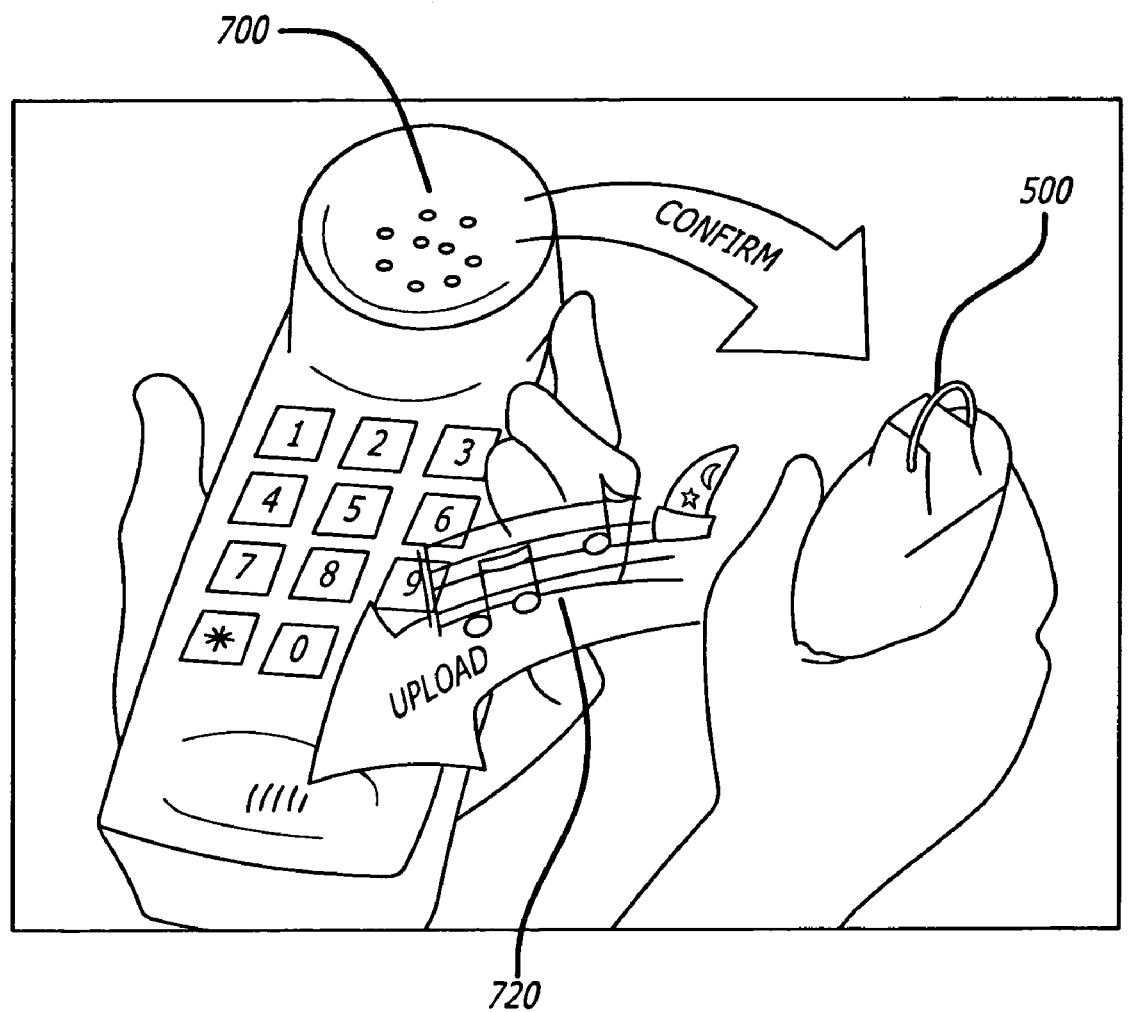
FIG. 13 depicts one application of the present invention where there is a bi-directional exchange of data between the device and a telephone.

FIG. 13 depicts one application of the present invention where there is a bi-directional exchange of data between the device 500 and a telephone 700. In this situation, a person may redeem a prize by transmitting a certain number of tokens 720 from the device 500 to an end server (not shown) via the telephone link.

Figure 14:
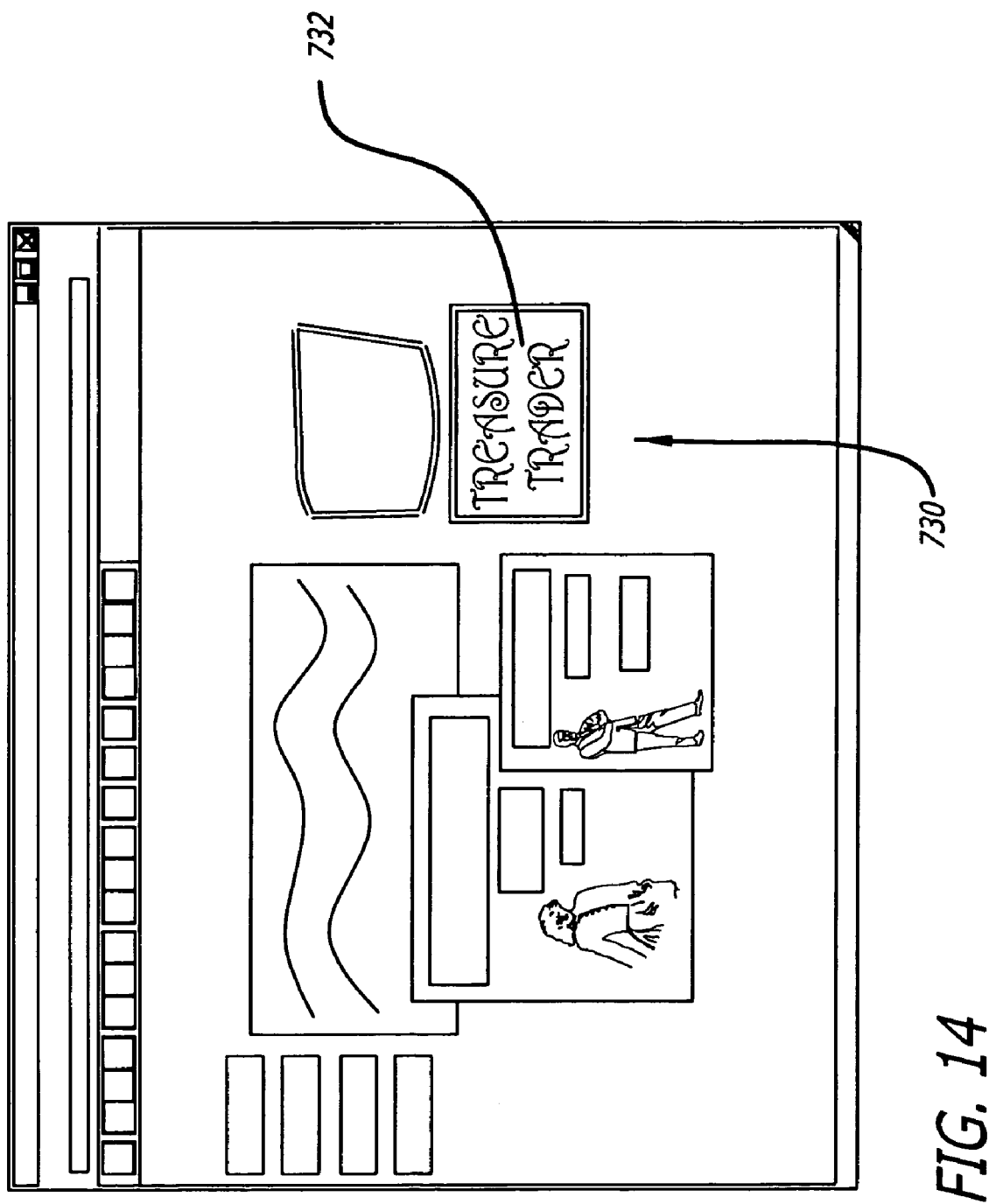
FIG. 14 shows a computer screen that includes a web link to access a page having information related to the device.

FIG. 14 shows a computer screen, depicting a web-page 730, that includes a link 732 to access a remote site (not shown). By clicking the relevant link on the web-page, a person may be directed to a remote site where he or she may be able to exchange tokens between a remote server and the device by means of desktop computer speakers and microphones. This aspect is shown in FIG. 17, where tokens 820 are transmitted from a remote server to the device 500.

Figure 15:
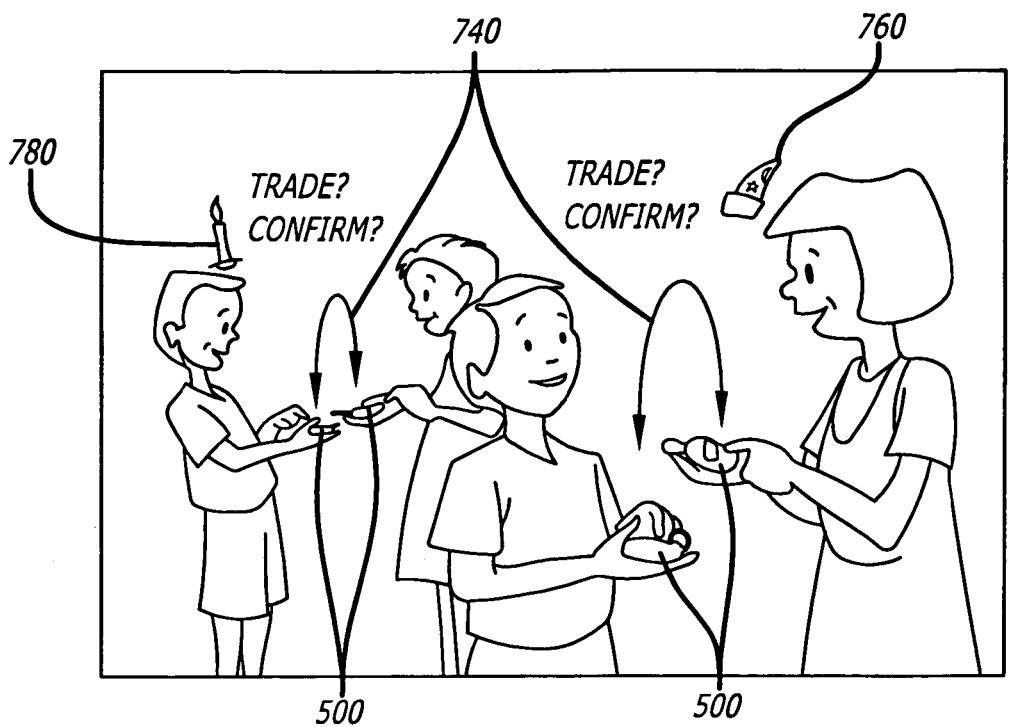
FIG. 15 depicts one application of the present invention where there is a bi-directional exchange of data between the devices used by children in an open environment (e.g., a playground)

FIG. 15 depicts another application of the present invention where there is a bi-directional exchange of data/tokens 740 between the devices 500 used by children in an open environment (e.g., a playground). Specifically, shown therein is a candle item 780 exchanged between two children and a sorcerer's hat item 760 exchanged between another two children.

Figure 16:
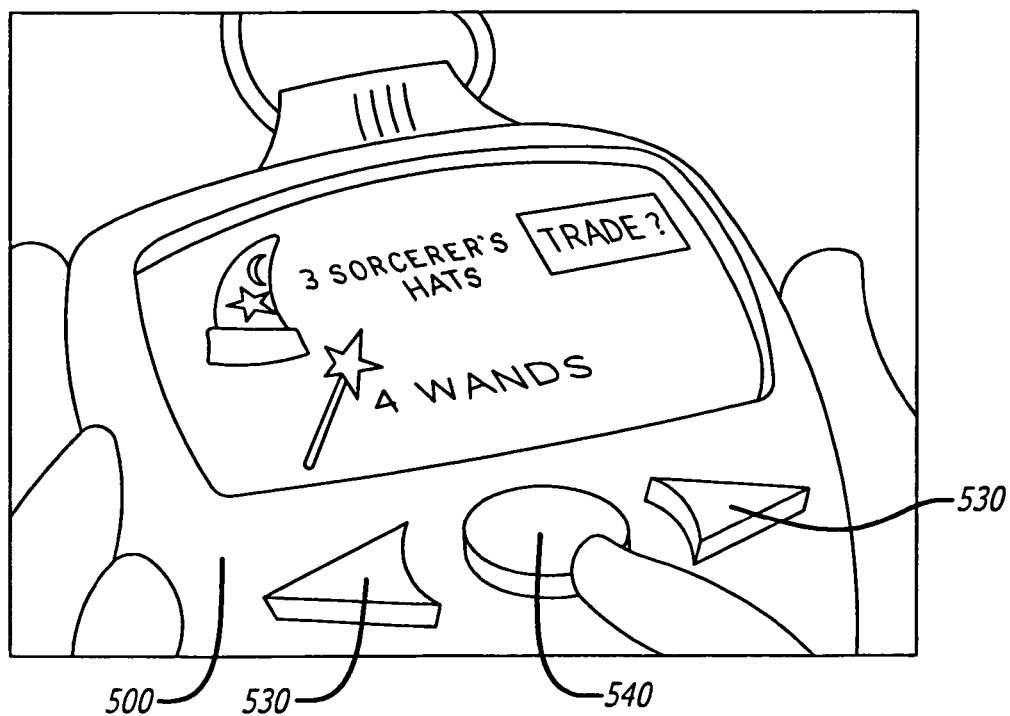
FIG. 16 shows a selected object, on a view screen of the device, that is to be transmitted or received via the present invention.

FIG. 16 shows selectable objects or items (i.e., 3 sorcerer hats and 4 magic wands), on a view screen of the device 500. These items can be viewed by means of the scroll buttons 530 and selected by means of the selection button 540 before transmission using audio/sound signals.

Figure 17:
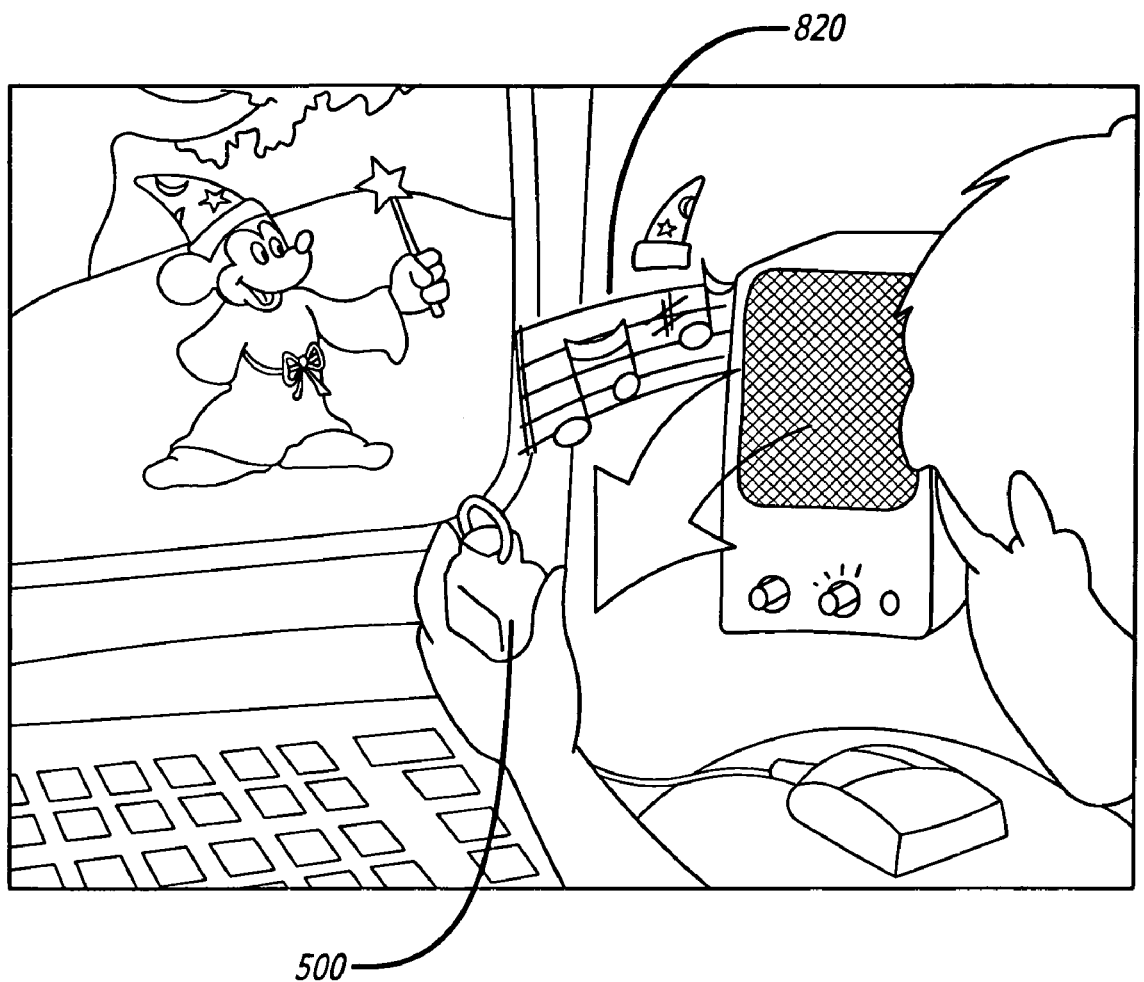
FIG. 17 depicts one application of the present invention where there is an unidirectional data flow between a speaker connected to a computer and the device.

FIG. 17 depicts one application of the present invention where there is unidirectional data flow between a speaker connected to a computer and the device.

Figure 18:
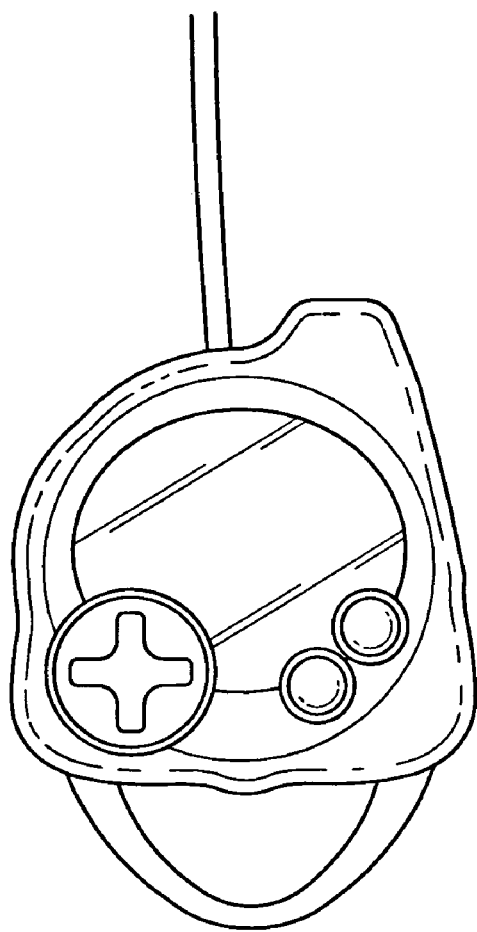
FIG. 18 shows a front view of the device according to one embodiment.
Figure 19:
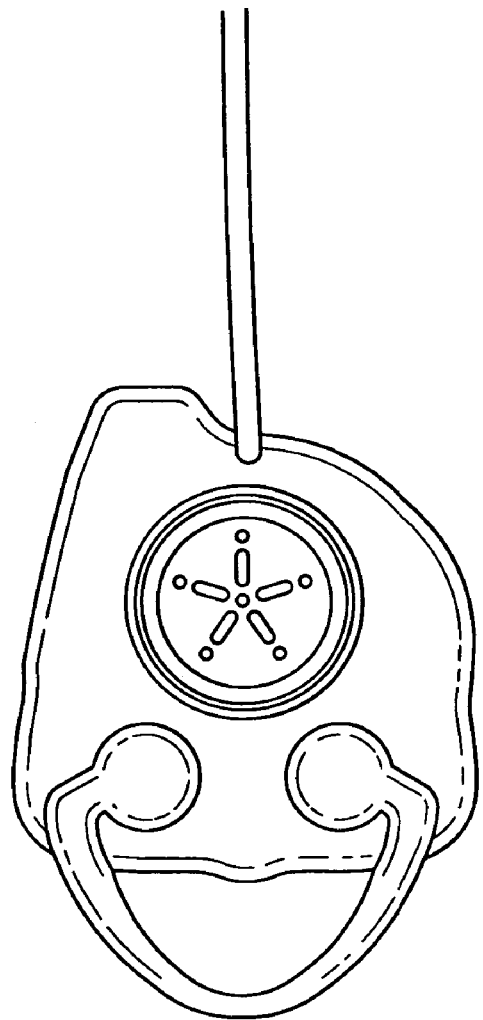
FIG. 19 shows the back view of the device of FIG. 18.

FIGS. 18 and 19 show front and back view of the device 500 according to another embodiment of the present invention.

Thus, the full system for transmitting and receiving digital data or tokens includes a device 500 having (i) a sound synthesis means (e.g., a sound card); (ii) a sound/data receiving means (e.g., a microphone); (iii) a sound/data transmission means (e.g., a loudspeaker); (iv) a processing means for encoding and decoding digital data (e.g., a DSP chip); and (v) analog-digital and digital-analog converters. The following description explains the encoding and decoding method of digital data/tokens with reference to FIGS. 1-6.

The present system, in its preferred embodiment, encodes the source signal using, for example, an extended Golay code encoding scheme 10. The encoded sequence or digitized data, at the output of the encoder 10, is modulated using the modulator system 12 onto chords consisting of three or more pure tone musical notes. This modulation involves amplitude modulation of each of the individual tones within the chord relative to each other. Because of the nature of the modulation, humans are unable to discern a difference in the sound of the transmission for different data patterns. The use of this system can be extended so that sound "content" for a variety of applications can be developed where the content is not adversely affected by the presence of the data. For the aforementioned scenario, the system can achieve a bit rate of about 12 bps (40 symbols per second, using redundancy and coding) so the tone would be a couple of seconds long—about the length of time that the "Dong" lasts in "Millionaire".

The encoded or message signal at the output of the encoder 10 is a digital signal. Depending on the nature of the encoder the digital signal may be of a predetermined length. In the present system the message consists of 40 bits having the following format: 00111010dddddddddddd00111010cccccccccccc, where 'd' is a data bit and 'c' is a correction bit.

The fixed pattern of 00111010 is an 8-bit section of a 7-length pseudo random number code. The twelve data bits, represented as 'd', can be any combination of bits. The correction bits, represented by 'c', are based on an extended Golay code. As is well known in the art, the code in the present case can correct 1, 2, or 3 errors. Four errors are uncorrectable but recognizable. More than 4 errors may be recognized as uncorrectable or may be falsely corrected.

For the modulation process in the modulator system 12, the sound consists of N tones (in the present exemplary depiction, N=6) with a fundamental frequency off $f_0$ Hz (in the present exemplary depiction, $F_0$=263 Hz) and M multiples of the fundamental frequency (in the present exemplary depiction, M=5). In one aspect of the invention, the non-fundamental tones (viz., the harmonics) may be at frequencies that are integer multiples of the fundamental frequency. In another aspect of the invention, the harmonics may be at non-integer multiples of the fundamental frequency. The tones are amplitude modulated. The frequencies $f_i$ (i=0, . . . , M=5) and amplitude factors $a_i$ (I=0, . . . , M=5) are:

| index | multiplier | frequency | amplitude data = 0 | amplitude data = 1 |
|---|---|---|---|---|
| 0 | 1 | 263 | 0.7 | 1.3 |
| 1 | 3/2 | 395 | 1.3 | 0.7 |
| 2 | 2 | 526 | 0.7 | 1.3 |
| 3 | 3 | 789 | 1.3 | 0.7 |
| 4 | 4 | 1952 | 0.7 | 1.3 |
| 5 | 6 | 1578 | 1.3 | 0.7 |

Figure 2:
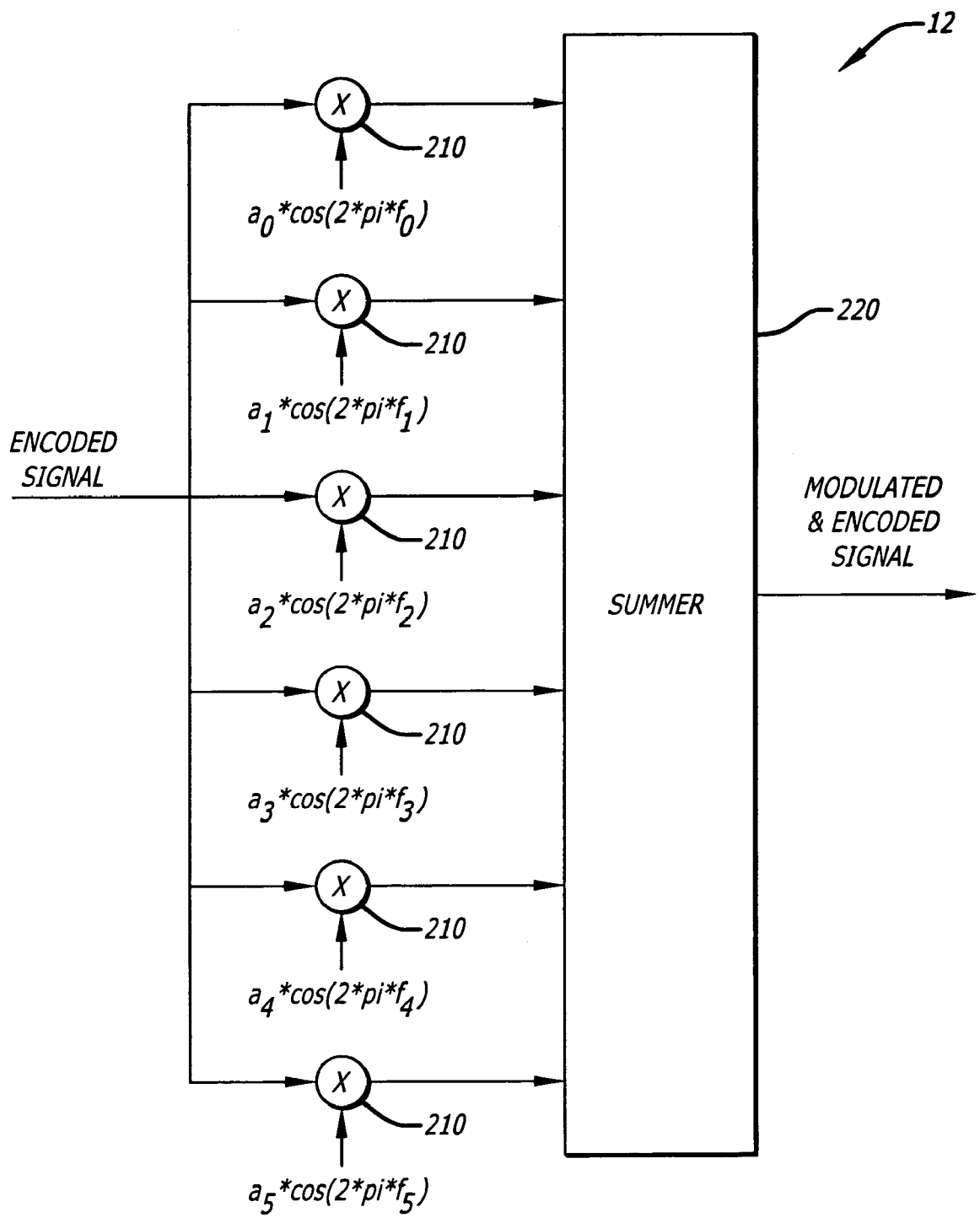
FIG. 2 shows a block diagram of the modulator depicting an exemplary embodiment of the tones having specific amplitudes and frequencies used for modulation.

The details of the modulator system 12 are depicted in FIG. 2. The encoded signal at the output of the encoder 10 is supplied to a bank of correlators 210. Each correlator 120 has two inputs, one input coming from the encoder 10 and the other input being a sinusoidal signal with appropriate frequencies and amplitude factors as tabulated above. The modulated tones are then summed in the summer 220 after the modulation.

The bit length is 6 cycles of the fundamental frequency. The data rate is therefore 44 bps. The data bit transitions occur at nulls of the modulated tones. The entire message is less than 1 second long.

A receiver is employed at the computer terminal or peripheral to receive the encoded and modulated signal transmitted by the peripheral or computer via the channel 14 (FIG. 1). The first step in the receiver, 16 (FIG. 1), is the recovery of the modulated tones.

Figure 3:
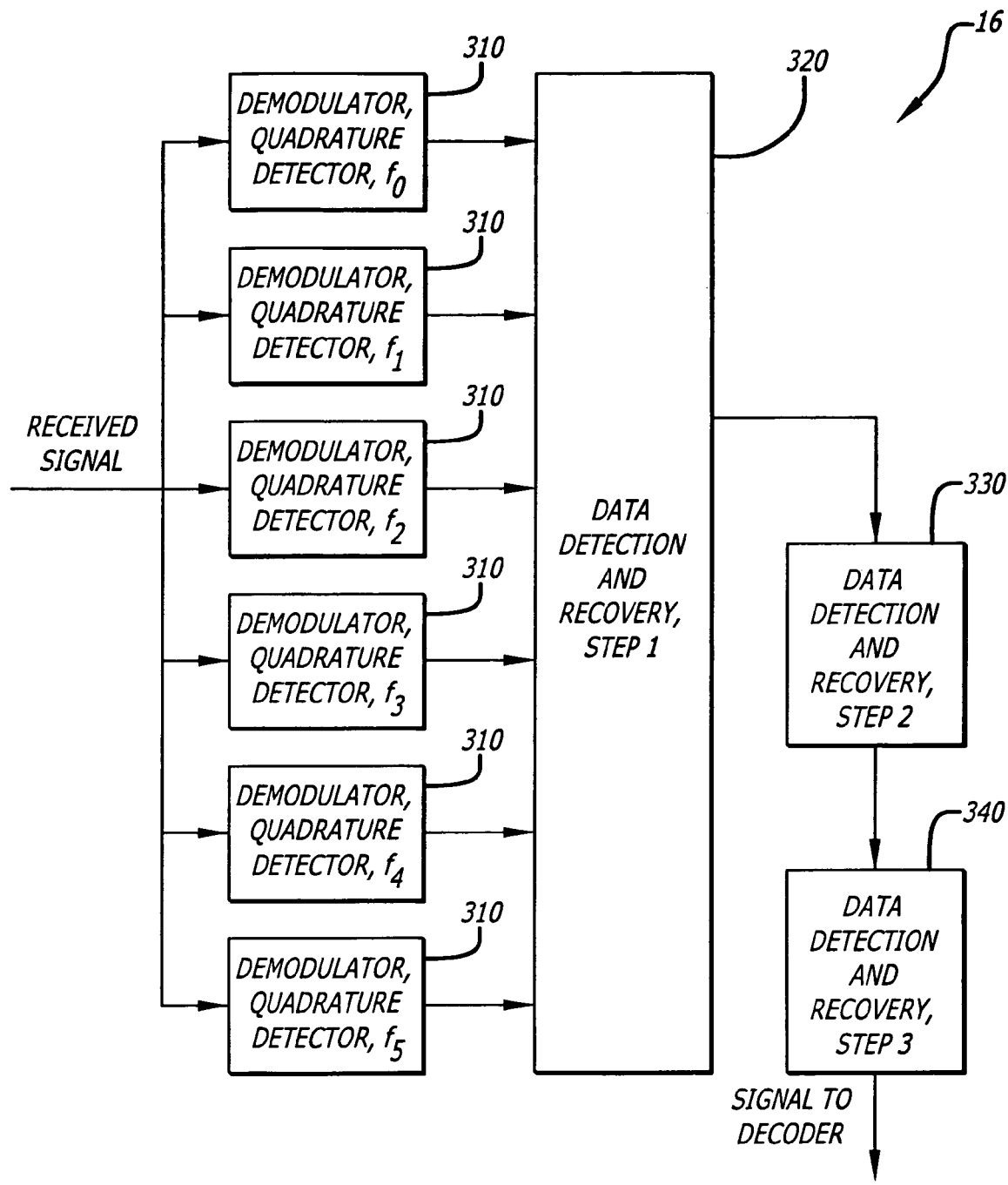
FIG. 3 is a block diagram depicting the receiver demodulator for the present invention.

The details of the first stage in the receiver 16, the demodulator and detector, are shown in FIG. 3. A quadrature detector 310 for each tone consists of a one-bit long replica of the tone that is convolved with the received signal both inphase and quadrature. The power of the output is sampled 4 times per bit length. This produces 6 time series. The sum of the odd index tones is subtracted from the sum of the even index tones to produce the signal which is used for data detection.

In the next stage of the detection process, and as denoted by 320 (FIG. 3), the signal is first examined to find two occurrences of the pattern 00111010 that are displaced by 20 bits. Data is detected by computing the sum of 8 consecutive bits and thresholding one sample in each bit interval. The mean is computed separately in each 8-bit interval. If 15 of the 16 bits are correct, the first step is successful and processing proceeds to the second step.

In the following step of data detection, and as denoted by 330, a data pattern 0111010 is convolved with the signal starting at the first sample used in step 1 and at 12 quarter bit interval after that. The maximum convolution output is determined for each repetition of the pattern. If the separation of the maxima is 80±2, then the second step is successful. The start of the data is adjusted by the position of this maximum correlation output.

In the final step, and as denoted by 340, the mean of the first 8 bits in step 1 is used to recover the 12 data bits. The mean of the second 8-bits in step 1 are used to recover the 12 correction bits. The combined 24 bits are then passed to an Extended Golay decoder. If the number of sensed errors is less than 4, then the data recovery is successful.

It is observed that: (i) the use of tones that are simultaneously increased and decreased leads to a more pleasing sound than all tones modulated in phase; (ii) the recovered tones have experimentally been found to have very different amplitudes due to the characteristics of the speakers and microphone that were used; (iii) combining all tones allows the stronger tones to dominate the data recovery; (iv) amplitude thresholding allows more errors to be accepted in the synchronization patterns and can provide more robust detection; and (v) the two synchronization patterns are separated by and separately used to set the data and correction thresholds to reduce the impact of fading in the channel.

In another aspect, coherent detection could be used to provide some gain over the incoherent quadrature detectors. Incoherent detection is used to avoid any issues of channel flatness or dispersion that might be more important in a coherent approach.

Figure 4:
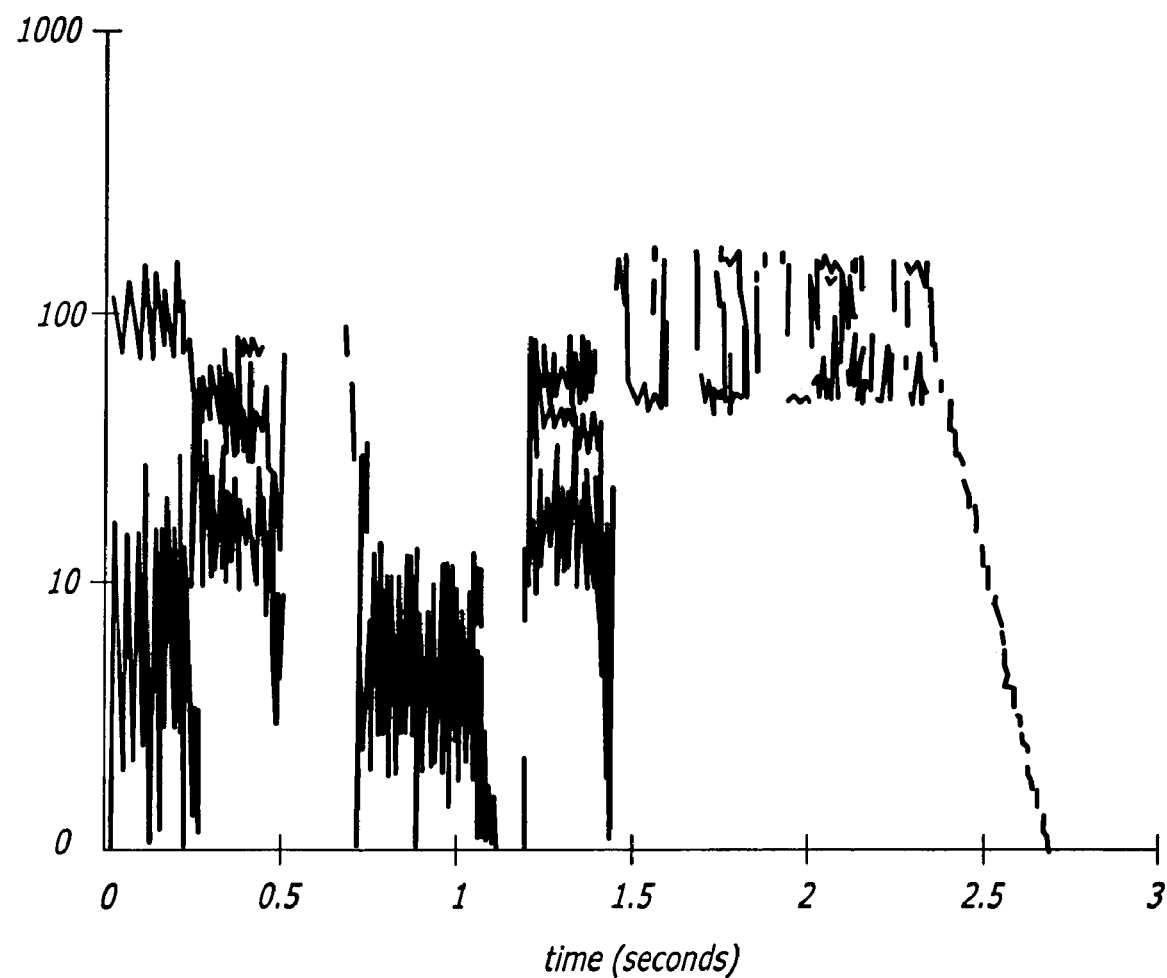
FIG. 4 displays the outputs of the six demodulators/quadrature detectors of FIG. 3.

Experiments demonstrate the workings of the present system. The experiment used 12 data bits of the form 000110101100. The 12 correction bits were 010101110011. The 40 bit message followed five notes made with unmodulated tones. The output of the 6 quadrature filters is shown in FIG. 4. Five notes can be seen to precede the message, which is at the right of the figure. The third note matches the message frequency, but is not modulated. The sound is damped without modulation following the last message bit.

Figure 5:
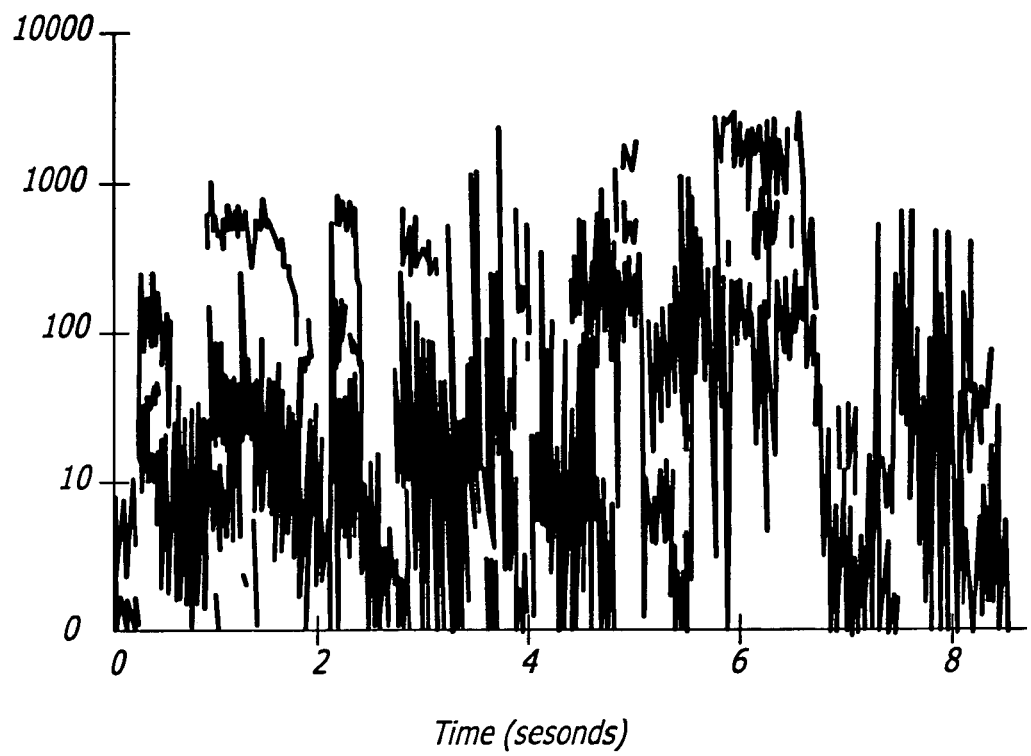
FIG. 5 is a plot of the detected tones when the sequence, corresponding to FIG. 4, was transmitted from a computer and digitized on a second computer in the presence of background noise.
Figure 6:
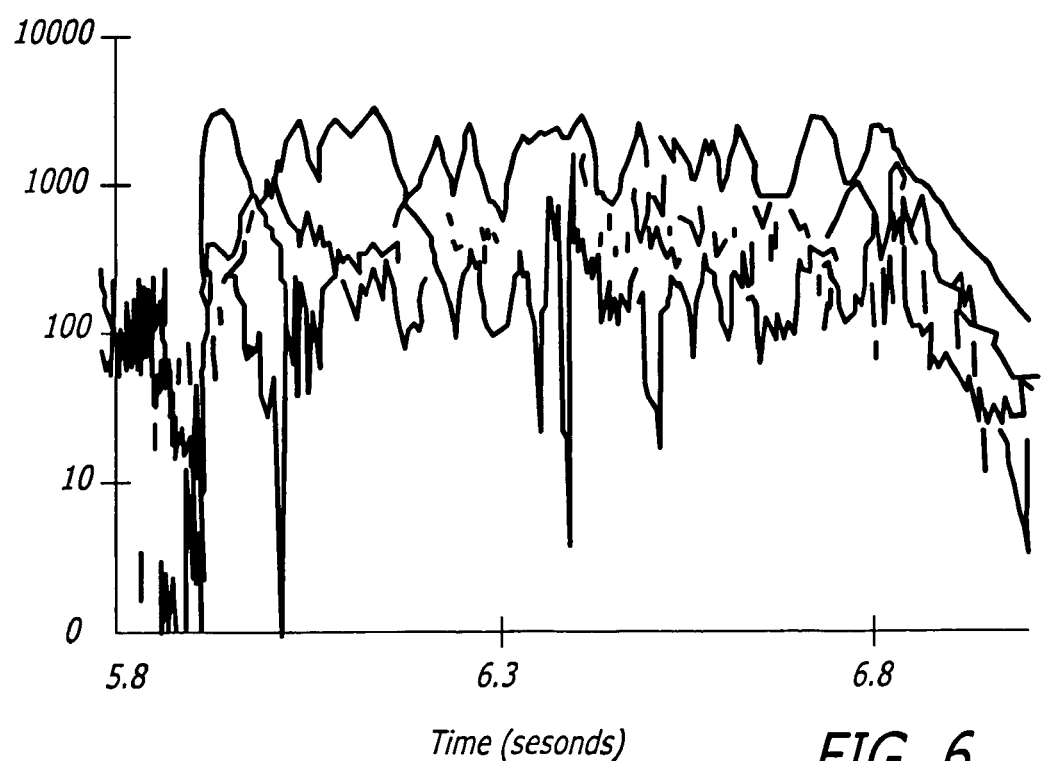
FIG. 6 is a close up snapshot of the message portion corresponding to the data in FIG. 5.

The above sequence was broadcast from a first computer and digitized on a second computer while a radio was used to generate background noise. The detected tones are shown in FIG. 5. A close-up of the message portion is shown in FIG. 6. In summary, the data was successfully recovered. The notes that precede the message, and the background noise, were successfully rejected using all 6 tones and with most combinations of fewer tones.

While the specification describes particular embodiments of the present invention, those of ordinary skill can devise variations of the present invention without departing from the inventive concept. For example, the number of frequency components used may be more or less than six. The fundamental frequency, the multipliers, and the amplitude factors may be designed according to the application involved such as in Bluetooth based devices for vehicular, multimedia, and other environments. Also, the probability of bit error may be minimized by designing appropriate modulator (demodulator) systems such as a Quadrature Amplitude Modulator (QAM).

We claim the following:

1. A digital data transmitting system using acoustic tones, the system comprising:
    a) at least one generator generating digital data;
    b) a modulator system, said modulator system modulating a plurality of pure tone notes with the digital data, wherein a first set of harmonics in the plurality of pure tone musical notes are at integer multiples of a fundamental frequency; and
    c) at least one loudspeaker, the loudspeaker transmitting the modulated tones.

2. The digital data transmitting system according to claim 1, wherein the digital data comprises a pseudo random code.

3. The digital data transmitting system according to claim 2, wherein the digital data further comprises a plurality of message bits.

4. The digital data transmitting system according to claim 3, wherein the digital data further comprises a plurality of correction bits.

5. The digital data transmitting system according to claim 4 wherein the correction bits are based on an extended Golay code.

6. The digital data transmitting system according to claim 4, the digital data being represented as 00111010dddddddddddd00111010ccccccccccc, wherein d is a message bit and c is a correction bit.

7. The digital data transmitting system according to claim 1, wherein the fundamental frequency of the plurality of pure tone musical notes is about 263 Hz.

8. The digital data transmitting system according to claim 7, wherein the harmonics within the plurality of pure tone musical notes are at multiples of 1.5, 2, 3, 4, and 6 of the fundamental frequency.

9. The digital data transmitting system according to claim 1, wherein the modulator system is an amplitude modulator.

10. The digital data transmitting system according to claim 1, further comprising a summer for summing the modulated tones.

11. The digital data transmitting system according to claim 1, wherein the tones lie between 20 Hz and 20 kHz.

12. The digital data transmitting system according to claim 1, wherein the tones lie in the infrasonic band.

13. The digital data transmitting system according to claim 1, wherein the tones lie in the ultrasonic band.

14. The digital data transmitting system according to claim 1, wherein a second set of harmonics within the plurality of pure tone musical notes are at non-integer multiples of the fundamental frequency.

15. A method for transmitting digital data using acoustic tones, the method comprising:
    a) generating digital data;
    b) modulating a plurality of pure tone notes with the digital data, wherein a first set of harmonics in the plurality of pure tone musical notes are at integer multiples of a fundamental frequency; and
    c) transmitting the modulated tones through a loudspeaker.

16. The method for transmitting digital data using acoustic tones according to claim 15, further comprising the step of summing the modulated tones after modulation.

17. The method for transmitting digital data using acoustic tones according to claim 15, wherein the digital data comprises a pseudo random code.

18. The method for transmitting digital data using acoustic tones according to claim 17, wherein the digital data further comprises a plurality of message bits.

19. The method for transmitting digital data using acoustic tones according to claim 18, wherein the digital data further comprises a plurality of correction bits.

20. The method for transmitting digital data using acoustic tones according to claim 19, wherein the correction bits are based on an extended Golay code.

21. The method for transmitting digital data using acoustic tones according to claim 20, the digital data being represented as 00111010dddddddddddd00111010cccccccccccc, wherein d is the message bit and c is the correction bit.

22. The method for transmitting digital data using acoustic tones according to claim 15, wherein the fundamental frequency of the plurality of pure tone notes is 263 Hz.

23. The method for transmitting digital data using acoustic tones according to claim 22, wherein harmonics within the plurality of pure tone notes are at multiples of 1.5, 2, 3, 4, and 6 of the fundamental frequency.

24. The digital data transmitting system according to claim 15, wherein the modulation is performed by an amplitude modulator.

25. The digital data transmitting system according to claim 15, wherein the tones lie between 20 Hz and 20 kHz.

26. The digital data transmitting system according to claim 15, wherein the tones lie in the infrasonic band.

27. The digital data transmitting system according to claim 15, wherein the tones lie in the ultrasonic band.

28. The digital data transmitting system according to claim 15, wherein a second set of harmonics within the plurality of pure tone musical notes are at non-integer multiples of the fundamental frequency.

29. A receiver for receiving acoustic tones modulated by digital data, the receiver comprising:
    a) a plurality of quadrature detectors, one for each of a plurality of tones, for recovering a baseband signal from a bandpass signal, said bandpass signal comprising the plurality of amplitude modulated tones;
    b) a data detector for detecting data in the baseband signal following a first pseudo random code sequence and a second pseudo random code sequence;
    c) a correlator for extracting a plurality of message bits following the first pseudo random code sequence and a plurality of correction bits following the second pseudo random code sequence; and
    d) a decoder for determining the number of errors in the message bits.

30. The receiver according to claim 29, wherein the quadrature detector for each tone comprising a one-bit replica of said tone.

31. The receiver according to claim 30, wherein the one-bit replica of said tone is convolved with the bandpass signal inphase and quadrature to produce an output signal.

32. The receiver according to claim 31, further comprising the step of sampling the output signal 4 times per bit length to generate a plurality of time series.

33. The receiver according to claim 29, wherein a sum of odd tones is subtracted from a sum of even tones to produce the baseband signal.

34. The receiver according to claim 29, wherein the data is detected by computing a first sum of bits in the first pseudo random code sequence and a second sum of bits in the second pseudo random code sequence.

35. The receiver according to claim 29, wherein a maximum convolution output is determined by convolving a binary pattern 0111010 with the baseband signal.

36. The receiver according to claim 29, wherein a mean of the first pseudo random code sequence is used to recover the message bits.

37. The receiver according to claim 29, wherein a mean of the second pseudo random code sequence is used to recover the correction bits.

38. The receiver according to claim 29, wherein the decoder is an extended Golay code decoder.

39. A method for receiving acoustic tones modulated by digital data, the method comprising:
    a) recovering a baseband signal from a plurality of modulated tones;
    b) detecting data in the baseband signal following a first pseudo random code sequence and a second pseudo random code sequence;
    c) extracting a plurality of message bits from the data following the first pseudo random code sequence and correction bits following the second pseudo random code sequence; and
    d) determining the number of errors in the message bits by a decoder.

40. The receiver according to claim 39, wherein the quadrature detector for each tone comprising a one-bit replica of said tone.

41. The receiver according to claim 40, wherein the one-bit replica of said tone is convolved with the bandpass signal inphase and quadrature to produce an output signal.

42. The receiver according to claim 39, wherein the data is detected by computing a first sum of bits in the first pseudo random code sequence and a second sum of bits in the second pseudo random code sequence.

43. The receiver according to claim 39, wherein the decoder is an extended Golay decoder.

* * * * *